United States Patent
Ganser

(10) Patent No.: US 6,944,326 B1
(45) Date of Patent: Sep. 13, 2005

(54) VIDEO MICROSCOPY METHOD

(75) Inventor: Michael Ganser, Giessen (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 0 days.

(21) Appl. No.: 09/646,684

(22) PCT Filed: Mar. 11, 2000

(86) PCT No.: PCT/DE99/00664

§ 371 (c)(1),
(2), (4) Date: Sep. 20, 2000

(87) PCT Pub. No.: WO99/49348

PCT Pub. Date: Sep. 30, 1999

(30) Foreign Application Priority Data

Mar. 23, 1998 (DE) ................................ 198 12 599

(51) Int. Cl.⁷ ............................. G06K 9/00; G06K 9/32
(52) U.S. Cl. ..................... 382/151; 382/295; 382/298
(58) Field of Search ..................... 382/148, 151, 382/152, 282, 291, 293, 298–300, 149, 295; 348/561, 581; 359/363, 368, 369, 380, 391, 359/291

(56) References Cited

U.S. PATENT DOCUMENTS

| | | | |
|---|---|---|---|
| 4,643,540 A | * | 2/1987 | Kawasaki et al. .......... 359/368 |
| 5,276,550 A | * | 1/1994 | Kojima ....................... 359/368 |
| 5,642,040 A | * | 6/1997 | Takahashi et al. ............ 324/96 |

FOREIGN PATENT DOCUMENTS

| | | |
|---|---|---|
| DE | 691 12 111 | 1/1996 |
| EP | 0 119 857 | 9/1984 |
| EP | 0 353 504 | 2/1990 |
| EP | 0 453 239 | 10/1991 |
| JP | 05300521 | 11/1993 |

* cited by examiner

Primary Examiner—Mehrdad Dastouri
(74) Attorney, Agent, or Firm—Simpson & Simpson, PLLC

(57) ABSTRACT

Process for video microscopy in which an image of an object (9) on a microscope stage (7) generated by a microscope (1) is recorded with a video camera, digitized, stored temporarily, and displayed on the monitor (13) of a personal computer (12). At one known magnification $V_1$, an image detail (15) is selected. Its image coordinates $\vec{r}_1 = (x_1, y_1)$ relative to the center (18) of the image on the monitor screen (17) are determined at the proper scale. After a change in magnification from magnification $V_1$ to another magnification $V_m$ the position of the image detail (15) on the monitor screen is kept the same by moving the microscope stage (7) in the proper direction by $\vec{r}_1(1/V_m - 1/V)$.

11 Claims, 1 Drawing Sheet

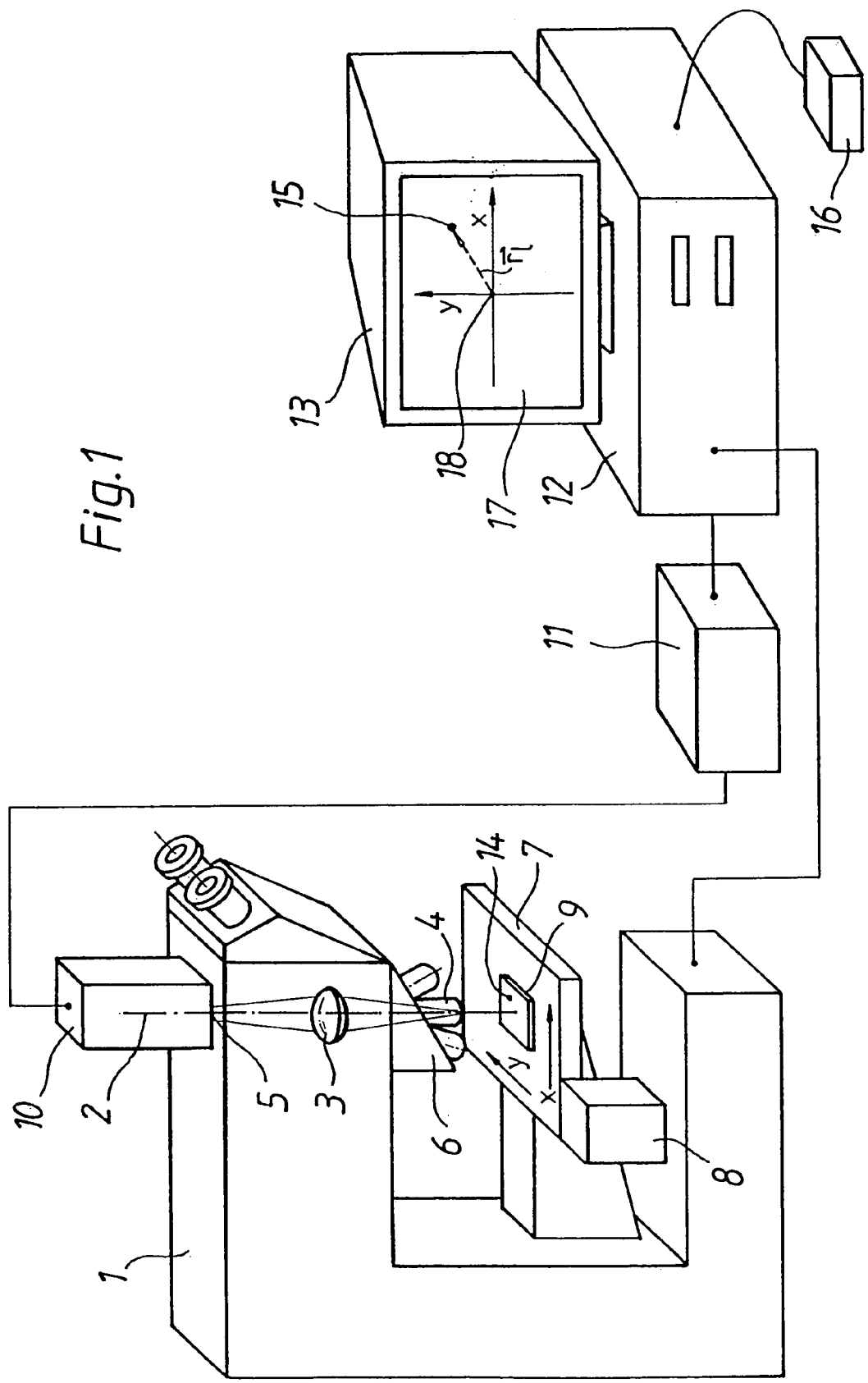

VIDEO MICROSCOPY METHOD

The invention concerns a process for video microscopy according to the generic concept of claim 1.

Optical systems, such as microscopes, are usually designed so that the center of an image field coincides with the optical axis. On focusing, or on changing of magnification, therefore, image points at the center of an image field do not change their position in the image field. All the image points outside the optical axis, i.e., out of the center of the image, move outward or inward on focusing or on changing of magnification, depending on the imaging of the optical system.

In microscopes, high optical and mechanical precision assure that when the objective is changed the center of the image always stays on the optical axis. An object that is to be examined at different magnifications must be moved sufficiently far toward the center of the image before the magnification is changed so that it is not outside the image after the change of magnification.

This manual back and forth movement is particularly bothersome and tedious if large objects must be examined systematically, field by field, or if the magnification must be changed frequently.

In video microscopy, in which a microscope image is recorded with a video camera, processed, and displayed on a monitor, changes of magnification are more frequent than with conventional microscopy with oculars. That is because the video camera limits the size and resolution of the camera image. Thus, for a given image field, the resolution of the video image is much poorer than the resolution of the image in the ocular.

Also, video cameras in current use at this time can record only a central portion of the ocular image. Therefore the object must be moved more often to examine a large object with a video camera on a microscope than with ocular examination, and in each position it must be examined at different magnifications. With a change in magnification, an object detail outside the center of the image often vanishes from the monitor. Then the object must first be moved appropriately and the detail must be located anew and fixed at the new magnification.

The frequent change of magnification with the back and forth movement of the object which it requires leads to an undesirably high expenditure of time. The work is also very unergonomic and tiring for the user of the video microscopy system, because the eyes experience light-dark stimulus at each change of magnification and then must find anew and fix a desired detail.

German DE 691 12 111 T2 describes an optical microscope for video microscopy which makes more ergonomic operation possible. Beginning with a survey image at low magnification, a rectangular image area of interest for all further examinations is selected. It is centered by a single movement of the stage and zoomed. Then the selected image region always appears centered at all magnifications without further movement of the stage. It is undesirable and time-consuming that the environment of the selected image region, and thus the orientation of the survey image, is lost and, for certain stage movements, must be searched for again. It is also disadvantageous that all the image points outside the optical axis move inward or outward on a change of magnification and must first be sought out and fixed visually. That is tedious and tiring.

Therefore, it is the objective of this invention to report a process by which particular object details, especially those outside the optical axis, can be examined without time-consuming manual back and forth movements on a change of magnification. Instead, the user ergonomically and quickly finds the image detail being examined from a survey image again, preferably at the same position on the monitor, at all magnifications, and can at any time return to the unaltered survey image.

The present invention discloses a process for video microscopy in a system including an object (9) on a movable microscope stage (8) imaged on a video camera (10) by means of a microscope (1). Microscope (1) includes an optical axis (2) passing through a microscope optical system (3) and a microscope objective (4) on an objective revolver (6), with motorized and coded stage control (8). A video camera (10) at a camera output (5) is centered on the optical axis (2). With a readable coding of the magnification setting on the objective revolver (6), the analog output signal from the video camera (10) is digitized with an A/D image converter (11) and temporarily stored in an image memory. The digital signal is transferred to a personal computer (PC) (12) and displayed on a monitor (13) connected to the computer. The present invention selects, at any desired magnification $V_1$ of the video system, a point-like image detail (15), preferably lying outside the optical axis (2), by clicking with a computer mouse (16) linked to the PC (12).

The image coordinates $\vec{r}_1 = (x_1, y_1)$ of the selected image detail (15) relative to the center (18) of the monitor image (17) are determined by reading the applicable digital line and column values for the image from the image memory and converting to the proper scale with the selected magnification $V_1$ of the video system and the camera pixel width. After a change from the magnification $V_1$ to a different magnification $V_m$, the microscope stage (7) is moved in the proper direction by $\Delta \vec{p} = \vec{r}_1(1/V_m - 1/V_1)$, and analogously for a magnification change from a value $V_n$ to a value $V_p$, so that the selected image detail (15) appears in at least approximately a fixed position on the monitor screen (17).

The invention is based on the concept of determining the offset of an image detail being considered from the center of the image, with respect to the scale of the image and, following a change of magnification, keeping the position of the image detail in a fixed location on the monitor by suitable motorized movement of the microscope stage and the object upon it.

The invention is explained on more detail by means of an example embodiment, using the schematic drawing.

The FIGURE shows a microscope 1 with an optical axis 2 passing through a microscope optical system 3 built into and covered by the upper part of the microscope, and a microscope objective 4 in the working position on an objective revolver 6. At the top of the microscope there is a camera output 5 which is centered on the optical axis 2. The magnification is set in the known manner by rotating a desired microscope objective 4 into the beam path along the optical axis 2. The microscope 1 is equipped with magnification coding, not shown here, on the objective revolver 6. This magnification coding can, for example, comprise coded line markings for the openings on the rotatable lower part of the objective revolver 6 for the openings for mounting the objectives, an a sensor on the upper, fixed part of the objective revolver 6 which is fastened to the stand. Then the objective revolver opening which is turned into the beam path provides an unmistakable signal at the output of the sensor due to the coded line markings assigned to that opening. Before beginning the microscopic observation, therefore, the assignment of the microscope objectives used to the objective revolver openings must be defined.

The microscope 1 also has a movable microscope stage 7, with motorized and coded stage control 8 in the x and y directions. An object 9 is placed on the microscope stage. The object is imaged by the microscope objective and the microscope optical system 3 onto the camera output 5 of the microscope 1. A video camera 10 is mounted on the camera output 5. The center of the video image coincides with point through which the optical axis 2 of microscope 1 passes. The video camera 10 is connected to an A/D image converter 11 (a "frame grabber"). The analog output signals from the video camera 10 are digitized by the A/D image converter 11 and temporarily stored in an integrated image memory. From there, the digital image signals are transferred to a personal computer (PC) 12 and are displayed on a monitor 13 connected to the PC 12.

The elements of equipment described, and the processing steps carried out up to this point are known. The process steps according to the invention are described in the following.

An object detail 14 of object 9, lying outside the optical axis 2 appears as the image detail 15 outside the center of the microscope image and also outside the center of the video image shown on the monitor. If such an off-center image detail 15 is being examined, its position on the monitor will change with a change in magnification. Often a change to higher magnification will actually cause the image detail 15 to vanish from the monitor 13, so that the microscope user loses the image detail 15 from the image field. In the process according to the invention, the user employs a computer mouse 16 linked to the PC 12 to click on the desired image detail 15 which he wishes to examine on the monitor at different magnifications.

The magnification factor of the video system is determined by the microscope magnification and the camera magnification by which the microscope image at the camera output 5 of microscope 1 is reduced to the size of the video chip in the video camera 10. The microscope magnification at any particular time depends on which microscope objective 4 is rotated into the beam path.

Before beginning microscopy work, therefore, the necessary quantities, i.e., the microscope magnification, camera magnification, magnifications of the microscope objectives used, and the pixel size of the video chip (in □m, for instance), as well as the assignment of the microscope objectives used to the coded openings of the objective revolver 6 must be stored in memory in the PC 12.

The selected magnification factor $V_1$ of the video system is determined, from a number of possible magnifications, after interrogating the magnification code on the objective revolver 6 of the microscope 1.

Then the offset of the image detail 15 relative to the center of the image field, established by the point through which the optical axis 2 passes, is determined at the proper scale. The offset of the image detail 15 is indicated by its image coordinates, the scale of which is determined by the pixel size of the video camera chip.

FIG. 1 shows schematically a monitor screen 17 with a section of the image of object 9 and with an image detail 15 outside the center of the image field 18, with the image coordinates $\vec{r}_1=(x, y)$. The center of the image field 18 is the origin of the selected x,y coordinate system.

To determine the image coordinates $\vec{r}_1$, the digital line and column values of the image of image detail 15 are read out of the image memory of the A/D image converter 11. Then the image coordinates $\vec{r}_1=(x_1, y_1)$ of image detail 15 are determined at the correct scale using the known magnification factor $V_1$ of the video system and the known pixel size of the camera.

The object coordinates $\vec{p}_1$ of the particular object detail 14 on object 9 are $\vec{p}_1 = \vec{r}_1/V_1$.

Now it is necessary to specify the vector by which object 9 must be moved to keep the image detail 15 on the monitor 13 after a change from magnification $V_1$ to a different magnification $V_m$. To do so, the following relation is established: after the desired object movement the image coordinates $\vec{r}_1$ and $\vec{r}_m$ should be identical at both magnifications. That is, it is necessary that $$\vec{r}_1 = \vec{r}_m.$$

Then for the objective coordinates it is necessary that:

$$\vec{p}_m - \vec{p}_1 = \vec{r}_1/V_m - \vec{r}_1/V_1 = \Delta\vec{p} \neq 0$$

Here $\Delta$ gives the desired object movement at the proper magnification. Therefore one has, for the necessary object movement:

$$\Delta\vec{p} = \vec{r}_1(1/V_m - 1/V_1)$$

In the last step of the process, the object 9 is moved in the proper direction, with the microscope stage 7, by $\Delta\vec{p}$ so that the selected image detail 15 is kept in a fixed position on the monitor screen 17. Thus, with proper selection of the coordinate system, $\Delta\vec{p}$ gives directly the required table movements in the x and y directions.

It is necessary, for optimal operation, that the pixel size of the video camera 10 be known, because the scaling of the required stage movements x and y can be derived from that.

Furthermore, the positioning accuracy of the microscope stage 7 must be at least of the order of magnitude of the pixel size of the video camera 10. The stage positioning must be as fast as possible to assure particularly brisk work after a change in magnification.

In the example described by FIG. 1, the image memory integral to the A/D image converter 11 is used, and the necessary image coordinates $\vec{r}_1=(x_1, y_1)$ are read from it. But it is equally possible to use another image memory so that the digital image signals can be stored in it and the required image coordinates can be read out from it. Such an additional image memory can, for instance, be integrated into the monitor.

In the process previously known, the monitor 13 was dark after a change in magnification. The continuing dark-light alternating with frequent changes of magnification proved very fatiguing for the observer. In one advantageous ergonomic embodiment of the invention, the video image from the previous magnification is maintained on the monitor 13 until the microscope stage 7 has been moved according to the invention and the new video image is ready. Only then is the new video image output to the monitor 13. Thus the dark phase at image change is avoided.

In a further ergonomic embodiment, the illumination of the microscope 1 is automatically adjusted to preset values for the field diaphragm, the aperture diagram, and the light source intensity. Those values can be preset by the microscope user at the beginning of the work, for example. These preset values can be stored, for example, as tables in the personal computer 12, and can be called as needed, depending on the objective magnification selected.

In another embodiment, an image brightness sensor integrated into microscope 1 gives an output signal on which the preset values depend and by which they are appropriately adjusted.

With the process according to the invention, an image detail 15 selected for examination is held in a fixed position on the monitor even when there is a change of magnification. Now, in case of changing to higher magnification, the surroundings of such a selected image detail 15 are also often of interest. But if the selected image detail 15 is already near the edge of the monitor, then on changing to higher magnification, the image detail 15 is indeed still in a fixed location on the monitor 13 after the process according to the invention, but part of its interesting surroundings vanished from the edge of the monitor.

To be able to examine the entire surroundings of the image detail 15, in one advantageous development of the process, after a change to higher magnification, the object 9 is not only moved by the vector $\vec{\Delta p} = \vec{r}_1(1/V_m - 1/V_1)$ but also shifted by a preselected portion $\vec{\Delta p}_k$ of $\vec{\Delta p}$. Therefore $\vec{\Delta p}_k = k \cdot 1/100 \cdot \vec{\Delta p}$, in which the index k, where $0 \leq k \leq 100$, is a percentage of the length of $\vec{\Delta p}$. The selected image detail 15, with all its surroundings of interest, is set back farther toward the center of the image by $\vec{\Delta p}_k$.

Thus, in an advantageous variant of the process, the preselected value of $\vec{\Delta p}_k$ can be between 5% and 20% of the object shift $\vec{\Delta p}$. With this small $\vec{\Delta p}_k$ the image detail 15 is only slightly shifted on the monitor 13. Thus it appears, with its surroundings, essentially in the fixed position on the monitor 13 and can easily be relocated and fixed by the microscope user.

The preselected value of $\vec{\Delta p}_k$ can be matched to the intended use. For instance, with a change from the objective magnification "5×" to "10×", $\vec{\Delta p}_k$ can be preset to 10% of $\vec{\Delta p}$. But if the objective magnification "5×" is changed directly to "50×", then $\vec{\Delta p}_k$ could be preselected as 20% of $\vec{\Delta p}$.

When a microscope stage 7 with the necessary high positioning accuracy and high stage movement speed is used, the new process offers rapid and comfortable video microscopy operation even with frequent changes of magnification.

In this way one gets a very ergonomic video microscopy work station at which one can work without fatigue even for a long period because when the magnification is changed the desired image detail appears in a fixed position on the monitor screen 17, or it appears with its entire surroundings in an essentially fixed position on the monitor. Furthermore, there is no light-dark alternation and the image is always optimally illuminated.

The process according to the invention is not limited to the stand type shown in the FIGURE. Rather, it can be carried out with any desired microscope stand as long as the necessary prerequisites such as camera output, coded magnification setting, and motorized and coded microscope stage control exist.

LIST OF REFERENCE FIGURES

1 Microscope
2 Optical axis of the microscope
3 Microscope optical system
4 Microscope objective
5 Camera output of the microscope 1
6 Objective revolver
7 Microscope stage
8 Motorized and coded stage control for the microscope stage 7
9 Object
10 Video camera
11 A/D image converter ("frame grabber")
12 Personal computer (PC)
13 Monitor
14 Object detail
15 Image detail
16 Computer mouse
17 Monitor screen
18 Center of image field

What is claimed is:

1. Process for video microscopy in which
an object (9) on a movable microscope stage (8) is imaged on a video camera (10) by means of a microscope (1) having an optical axis (2) passing through a microscope optical system (3) and a microscope objective (4) on an objective revolver (6), with motorized and coded stage control (8), with a video camera (10) at a camera output (5) centered on the optical axis (2) and with a readable coding of the magnification setting on the objective revolver (6),
the analog output signal from the video camera (10) is digitized with an A/D image converter (11) and temporarily stored in an image memory,
the digital signal is transferred to a personal computer (12) and displayed on a monitor (13) connected to the computer,
characterized in that
a) at any desired magnification $V_1$ of the video system, an image detail (15) preferably lying outside the optical axis (2) is selected by clicking with a computer mouse (16) linked to the PC (12),
b) the image coordinates $\vec{r}_1 = (x_1, y_1)$ of the selected image detail (15) relative to the center (18) of the monitor image (17) are determined by reading the applicable digital line and column values for the image from the image memory and converting to the proper scale with the selected magnification $V_1$ of the video system and the camera pixel width,
c) and after a change from the magnification $V_1$ to a different magnification $V_m$ the microscope stage (7) is moved in the proper direction by $\vec{\Delta p} = \vec{r}_1(1/V_m - 1/V_1)$, and analogously for a magnification change from a value $V_n$ to a value $V_p$, so that the selected image detail (15) appears in at least approximately a fixed position on the monitor screen (17).

2. Process according to claim 1,
characterized in that
in case of a change to a higher magnification the object (9) is moved by $\vec{\Delta p} + \vec{\Delta p_k}$ such that with $\vec{\Delta p}_k$ preselected according to the magnification, with $\vec{\Delta p}_k = k \cdot 1/100 \cdot \vec{\Delta p}$ and $0 \leq k \leq 100$, the image detail (15) is moved farther toward the center of the field (18).

3. Process according to claim 2,
characterized in that
only image details (15) in a certain marginal region of the monitor (13) are moved by $\vec{\Delta p} + \vec{\Delta p_k}$, while other image details (15) are only moved by $\vec{\Delta p}$.

4. Process according to claim 2,
characterized in that
values of $\vec{\Delta p_k}$, with $0 \leq k \leq 20$, are preselected, depending on the magnification.

5. Process according to claim 1,
characterized in that
the necessary image coordinates $\vec{r}_1 = (x_1, y_1)$ are read from an image memory of the A/D image converter (11).

6. Process according to claim 1,
characterized in that
the digital image signal is store in another image memory and the necessary image coordinates $\vec{r}_1 = (x_1, y_1)$ are read from this other image memory.

7. Process according to claim 6,
characterized in that
the other image memory is integrated in the monitor (13).

8. Process according to claim 1,
characterized in that
the microscope stage (7) is moved according to the invention after a change in magnification and only after that is the new video image displayed on the monitor (13).

9. Process according to claim 1,
characterized in that
after a change in magnification the illumination of the microscope (1) is automatically adjusted to preselected values for the field diaphragm, the aperture diaphragm, and the intensity of the light source.

10. Process according to claim 9,
characterized in that
the preselected values are adjusted in dependence on the current magnification.

11. Process according to claim 9,
characterized in that
the preselected values are adjusted in dependence on an output signal from an image brightness sensor.

* * * * *